United States Patent [19]

Miyahara et al.

[11] Patent Number: 5,256,075
[45] Date of Patent: Oct. 26, 1993

[54] CONNECTOR DEVICE

[75] Inventors: Masato Miyahara; Hironori Suzuki, both of Kameyama, Japan

[73] Assignee: The Furukawa Electric Co., Ltd., Tokyo, Japan

[21] Appl. No.: 973,220

[22] Filed: Nov. 6, 1992

Related U.S. Application Data

[60] Division of Ser. No. 819,576, Jan. 8, 1992, abandoned, which is a continuation of Ser. No. 668,359, Mar. 12, 1991, abandoned, which is a continuation of Ser. No. 529,949, May 29, 1990, abandoned.

[30] Foreign Application Priority Data

May 31, 1989 [JP]  Japan .................. 1-137826

[51] Int. Cl.$^5$ ............................ H01R 35/04
[52] U.S. Cl. ...................... 439/164; 439/15; 385/147
[58] Field of Search ............ 439/15, 164; 385/147

[56]  References Cited

U.S. PATENT DOCUMENTS

| | | | |
|---|---|---|---|
| 4,744,763 | 5/1988 | Suzuki et al. | 439/15 |
| 4,813,878 | 3/1989 | Schauer | 439/16 |
| 4,921,428 | 5/1990 | Sasaki et al. | 439/164 |
| 4,934,947 | 6/1990 | Brummans et al. | 439/77 |

FOREIGN PATENT DOCUMENTS 0243047 10/1987 European Pat. Off. .
62-124785 8/1987 Japan .

OTHER PUBLICATIONS

SAE Technical Paper Series; The Flat Cable Turning Over Phenomenon in The Roll Connector for The Air Bag; Ueno et al. (8 sheets); Sep. 18-21, 1989 Passenger Car Meeting and Exposition, Dearborn, Mich.

*Primary Examiner*—Gary F. Paumen
*Attorney, Agent, or Firm*—Frishauf, Holtz, Goodman & Woodward

[57]  ABSTRACT

A connector device includes a fixed housing fixed on a fixed member, a movable housing mounted on a rotatable member and freely rotatably combined with the fixed housing, and a flexible flat transmission line which serves to electrically or optically connect the fixed member to the rotatable member, which is wound in a spiral form and which is received in a space created by the fixed and movable housings. A clearance in an axial direction along the rotation shaft of the movable housing between the flat transmission line and the movable housing, or between the flat transmission line and the fixed housing is set to be smaller in the intermediate portion of the flat transmission line than in at least one of the end portions at which the flat transmission line is fixed on the housings so as to suppress occurrence of unpleasant vibration sound caused by collision between the flat transmission line and the housings.

10 Claims, 8 Drawing Sheets

CONNECTOR DEVICE

This application is a division of application Ser. No. 07/819,576, filed Jan. 8, 1992, which is a continuation of application Ser. No. 07/668,359 filed Mar. 12, 1991, which is a continuation of application Ser. No. 07/529,949 filed May 29, 1990 all now abandoned.

BACKGROUND OF THE INVENTION

1. Field of the Invention

This invention relates to a connector device for a transmission body for coupling two members which rotate relative to each other through a limited number of revolutions.

2. Description of the Related Art

For example, the prior art connector device shown in FIG. 1 is used with the steering device of a car. The connector device is used in a transmission body for transmitting an electric signal, light signal or electric power between a fixed member and a rotation member which rotates relative to the fixed member within a limited number of revolutions.

In the connector device, a fixed housing 1 and a movable housing 2 are rotatably combined with each other to create a ring-form space, and a flexible flat cable 3 is received in the ring-form space. The flat cable 3 is fixed at one end on an external cylindrical portion 1a of the fixed housing 1 and fixed at the other end on an internal cylindrical shaft portion 2a of the movable housing 2 which serves as a rotation shaft. Further, the flat cable 3 is loosely wound in a spiral form with a preset clearance $C_1$ between it and the inner wall of a flange portion 2b of the movable housing 2. With this construction, the housings 1 and 2 can be rotated relative to each other through a plurality of revolutions depending on (the ceiling and uncoiling) the tightening and loosening of the flat cable 3.

With the above connector device, since the flat cable 3 is loosely wound in the housings 1 and 2, the flat cable 3 is permitted to move not only in a radial direction with respect to the internal cylindrical shaft portion 2a but also in an axial direction along the internal cylindrical shaft portion 2a by a distance of the clearance $C_1$. Therefore, the flat cable 3 received in the housings 1 and 2 vibrates when the car is running, and it strikes the inner wall to generate an unpleasant impact or collision noise which is so-called "bouncing noise". In particular, since the speed at which the flat cable 3 collides against the inner wall increases as the clearance $C_1$ is made larger, the unpleasant bouncing noise becomes larger when the clearance $C_1$ is made larger.

In order to solve the above problem, for example, a connector device such as an electrical connection device shown in FIG. 2 has been proposed in which a flat cable 7 is received in housings which are respectively formed of a movable member 5 and a fixed member 6 and constructed to be freely rotated relative to each other and a resilient member having a projection arm 8a which serves to press the flat cable 7 against one of the movable member 5 and fixed member 6 is provided (Japanese Utility Model No. 62-124785; U.S. Pat. No. 4,744,763).

With the above prior art electrical connection device, generation of the unpleasant bouncing noise described above can be suppressed. It is, however, extremely difficult from an economical viewpoint to mass-produce the devices such that all of the products have a dimension precision high enough to always provide an adequate force of pressing the flat cable 7 against the movable member 5 or fixed member 6 under any operating conditions, in consideration of the manufacturing cost.

If sufficient dimensional precision is not attained and the flat cable 7 is applied with an excessively large force by the resilient member 8, smooth loosening and tightening of the cable are hindered, causing serious troubles such as a reversing of the flat cable 7 near the ends thereof at which it is fixed to the movable member 5 and the fixed member 6. This may result in disconnection of the conductive member in the flat cable, or an increased torque required for operation (SAE Paper 892010).

OBJECTS AND SUMMARY OF THE INVENTION

An object of this invention is to provide a connector device in which generation of an unpleasant bouncing noise due to the presence of the flat cable (belt-shaped transmission line) can be suppressed by inexpensive means.

Another object of this invention is to provide a connector device in which the operation of smoothly loosening and tightening the flat cable 7 can be effected under any operating condition.

In order to attain the above objects, according to this invention, there is provided a connector device which comprises a flexible flat transmission line wound in a spiral form, a movable housing having an internal cylindrical shaft portion which acts as a rotation shaft and on which one end of the flat transmission line is fixed, and a fixed housing having an external cylindrical portion on which the other end of the transmission line is fixed, the movable and fixed housings being freely rotatably combined with each other to receive the flat transmission line, and the movable and fixed housings being rotated relative to each other by a plurality of revolutions according to a tightening or loosening of the flat transmission line; wherein a clearance in an axial direction along the rotation shaft between the flat transmission line and the movable housing, or between the flat transmission line and the fixed housing being set to be smaller in the intermediate portion of the flat transmission line than in at least one of the end portions thereof.

Preferably, each of said movable and fixed housings has an internal surface facing a corresponding one of side surfaces of said transmission line wound in the spiral form, and a projecting portion projecting towards said transmission line is formed on at least one of said internal surfaces.

Further, preferably, each of said fixed and movable housings has an internal surface facing a corresponding one of side surfaces of said transmission line wound in the spiral form, and a spacer is mounted on at least one of said internal surfaces, the movable and fixed housings are so constructed as to have a projecting portion projecting towards the belt-shaped transmission line and formed on at least one of internal surfaces facing the winding side surfaces on two sides of the spirally wound belt-shaped transmission line in the width direction thereof.

Further, preferably, the belt-shaped transmission line is formed to be wider in the intermediate portion than in at least one of the end portions which are fixed on the movable and fixed housings.

Further, preferably, the movable and fixed housings have internal surfaces facing the winding side surfaces on two sides of the spirally wound belt-shaped transmission line in the width direction thereof and a spacer is provided on at least one of the internal surfaces.

In conventional connector devices, the clearances between the belt-shaped transmission line and the two housings along the axis of the rotary shaft are set to a value, larger than zero, so that free movement of the belt-shaped transmission line may not be hindered due to manufacturing error even when the devices are mass-produced on an economical basis, considering the dimensional precision of the width of the belt-shaped transmission line, the dimensional precision of the width of the annular space defined between the housings, and the dimensional precision and mounting angle of the fixed portions of the belt-shaped transmission line at which the transmission line is secured to the housings.

However, an intermediate portion of the belt-shaped transmission line except for the fixed end portions thereof within a certain distance (usually, about a ¼ of one complete turn of the spiral) from the fixed ends secured to the housings is allowed to bend due to its flexibility, and accordingly is not affected by the dimensional precision and mounting angle of the fixed portions. Therefore, the clearances between the intermediate portion of the belt-shaped transmission line except the fixed end portions thereof and the housings can be reduced to a value determined solely taking account of the dimensional precision of the width of the belt-shaped transmission line and the dimensional precision of the width of the annular space between the two housings. This invention is based on this understanding.

According to this invention, while the clearances defined near the fixed end portions of the belt-shaped transmission line are as large as those found in the conventional devices, the clearances defined by the other or intermediate portion of the transmission line can be reduced to a smaller value. This means that the speed of collision of the belt-shaped transmission line against the inner wall of the housings facing the sides of the transmission line can be significantly reduced at the major portion of the clearances, whereby the bouncing noise is substantially reduced.

An electrically conductive line having an electrically conductive member coated with an insulative member, a light transmission line having optical fibers interweaved therein, a transmission line having electrically conductive members and optical fibers interweaved therein or the like can be preferably used as the above belt-shaped transmission line.

The aforementioned aspects, other objects, features and advantages of the present invention will become more apparent from a consideration of the detailed description of the invention when considered in conjunction with the accompanying drawings.

DETAILED DESCRIPTION OF THE PREFERRED EMBODIMENTS

There will now be described an embodiment of this invention which is applied to a connector device for the steering device of a car with reference to the accompanying drawings.

Figure 1:
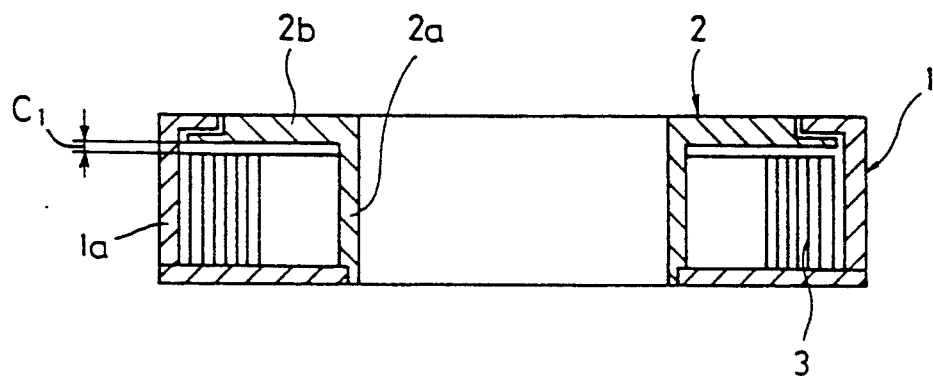
FIG. 1 is a vertical cross sectional view of a conventional connector device.
Figure 2:
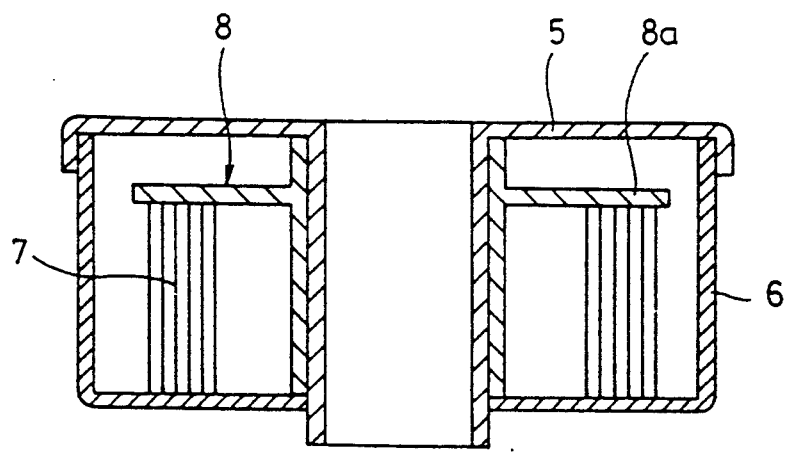
FIG. 2 is a vertical cross sectional view of another conventional connector device.
Figure 3:
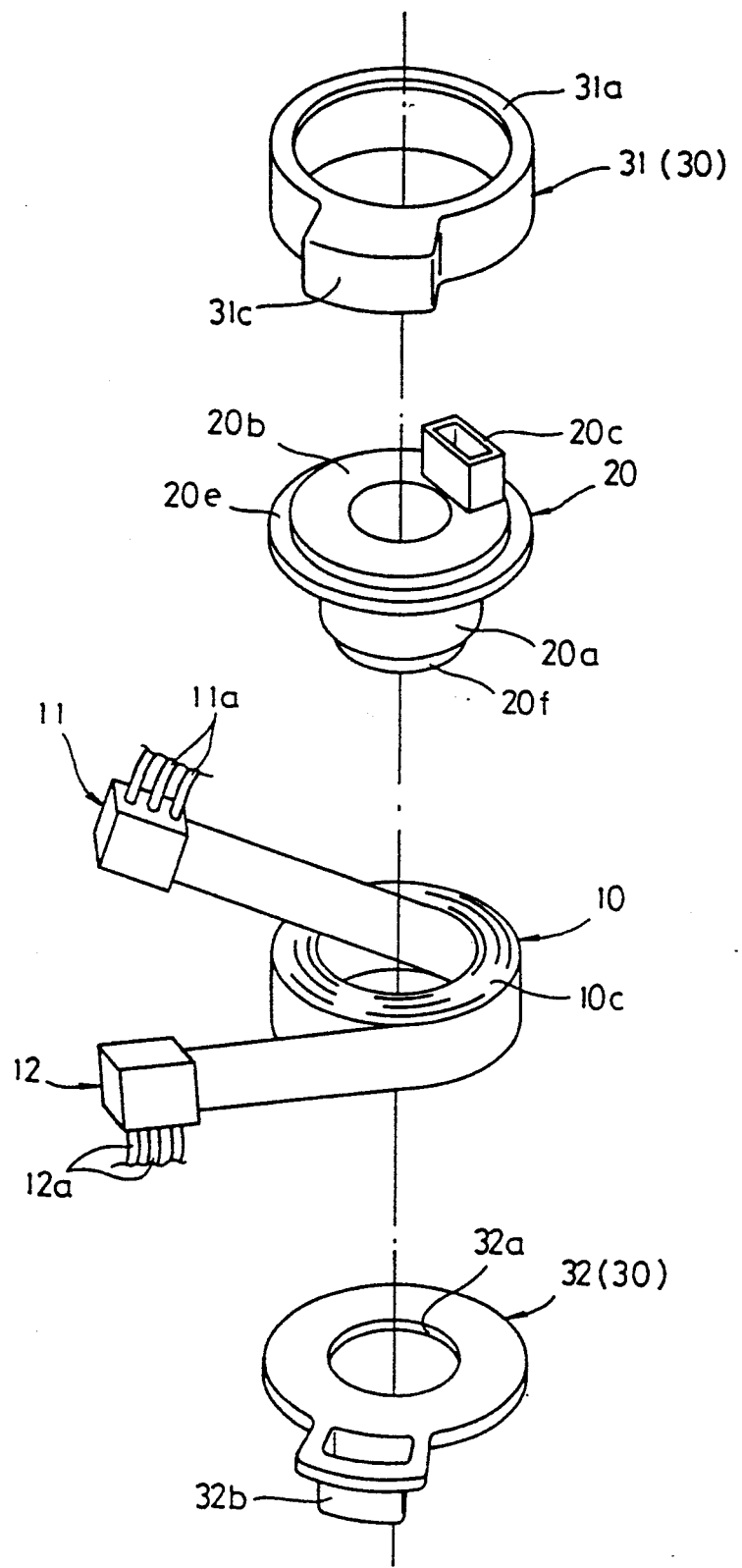
FIG. 3 shows a connector device according to a first embodiment of this invention and is an exploded view of the connector device used in the steering device of a car.
Figure 4:
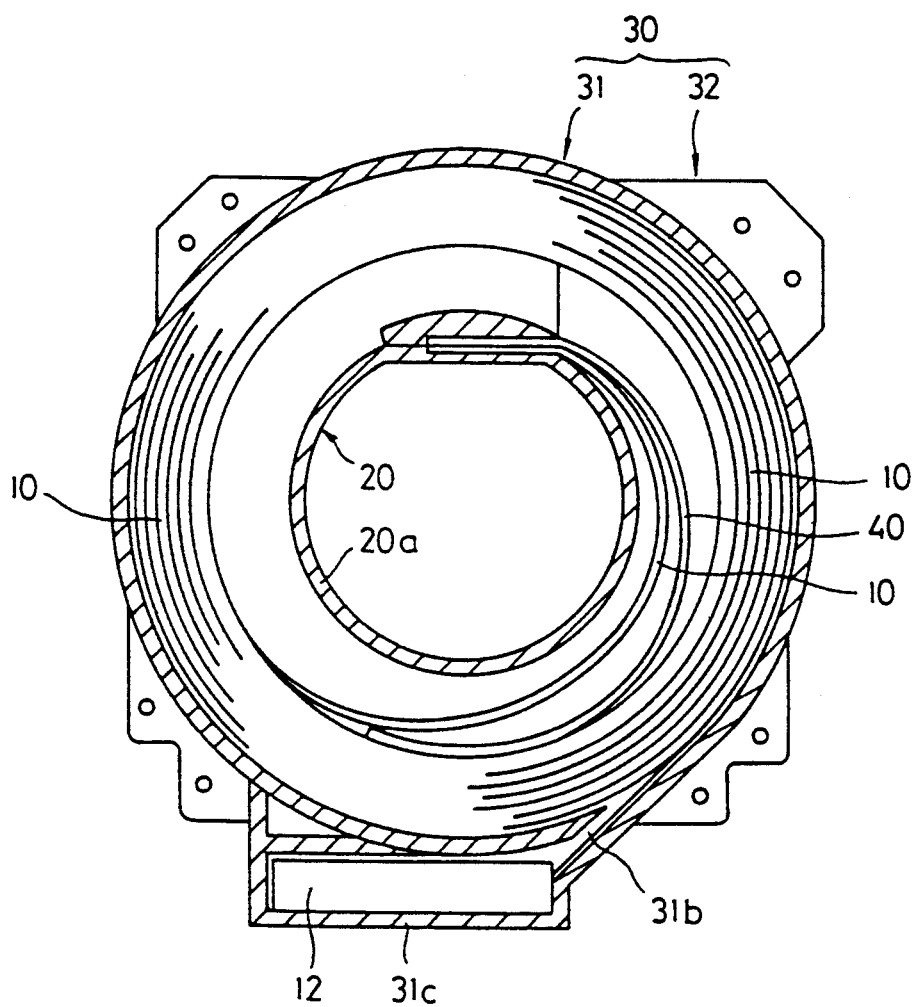
FIG. 4 is a horizontal cross sectional view of the above device.

FIGS. 3 to 8 show a first embodiment of this invention. As shown in FIGS. 3 and 4, a connector device includes a flat cable 10, a movable housing 20 having an internal cylindrical shaft portion 20a for fixing one end of the flat cable 10, and a fixed housing 30 having an external cylindrical portion 31 for fixing the other end of the flat cable 10 and a base plate 32.

Figure 5:
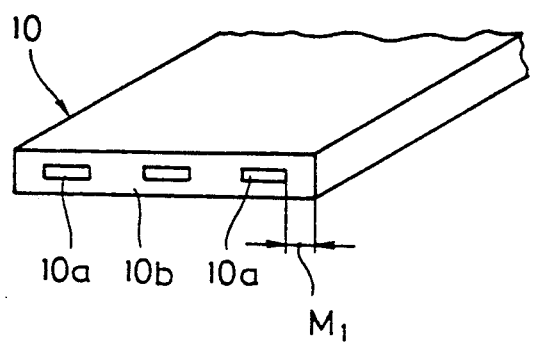
FIG. 5 is a perspective view of a flat cable used in the above device.

The flat cable 10 is a transmission line having a flat cross section in the width direction thereof and used for transmitting an electric signal, electric power or light signal, and for example, as shown in FIG. 5, it is a flexible belt-shaped transmission line having a plurality of flat rectangular conductive members 10a arranged in parallel with one another and coated with an insulative member, for example, a polyester film 10b. As shown in FIG. 3, mold sections 11 and 12 on which a plurality of electric wires 11a and 12a are mounted are integrally formed on opposite ends of the flat cable 10, and the flat cable 10 is connected to external connection terminals via the mold sections 11 and 12. The cable 10 is loosely wound in a spiral form as shown in FIGS. 3 and 4 and is received in a ring-form space or chamber created by the housings 20 and 30 (refer to FIGS. 4 and 6).

Figure 7:
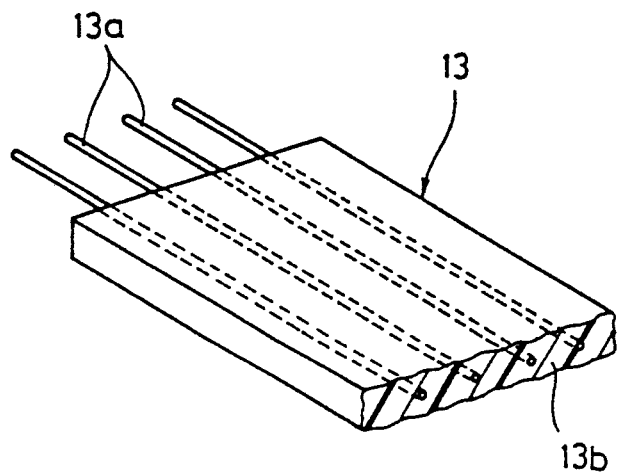
FIG. 7 is a perspective view of another flat cable used in the above device.
Figure 8:
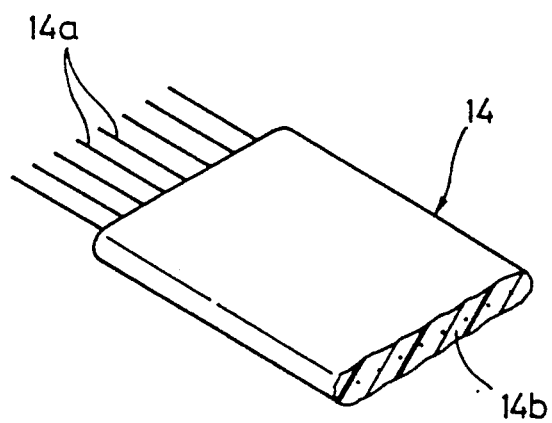
FIG. 8 is a perspective view of a light transmission line used in the above device.

In this case, the flat cable may be formed of an electrically conductive line having a plurality of conductors 13a which are arranged in parallel with one another and have a circular cross section and an insulative member 13b formed to cover the conductors 13a in the same manner as in the flat cable 13 shown in FIG. 7 or may be a tape fiber type light transmission line formed by interweaving a plurality of optical fibers 14a for transmitting a light signal into a coating member 14b as shown in FIG. 8. Further, the flat cable may be formed of a combination of an electrically conductive line and a light transmission line having electrically conductive members and optical fibers coated with an insulative member.

As shown in FIG. 3, the movable housing 20 has an internal cylindrical shaft portion 20a which serves as the rotation shaft of the housings 20 and 30 and a flange portion 20b formed to extend from the upper end of the internal cylindrical shaft portion 20a which are integrally formed. The movable housing 20 is mounted so as to be rotated together with a steering shaft (not shown) which is inserted into the internal cylindrical shaft portion 20a in an axial direction.

A rectangular cylindrical portion 20c for receiving the mold portion 11 for connection with the exterior is formed in the flange portion 20b. Further, as shown in FIG. 6, a projecting portion 20d projecting towards the flat cable 10 is formed on the underside of the flange portion 20b facing the winding side surface 10c of the flat cable 10.

The projecting portion 20d is formed in the form of inverted flat trapezoid, the inner and outer peripheral portions thereof are made low and a surface thereof facing the intermediate portion of the flat cable 10 extends in parallel to the winding side surface 10c. As a result, a clearance formed between the underside of the flange portion 20b and the winding side surface 10c and extending in an axial direction along the internal cylindrical shaft portion 20c which acts as the rotation shaft is made smaller in the intermediate portion of the flat cable 10 than in the opposite end portions thereof which are fixed on the housings 20 and 30.

Further, the movable housing 20 has stepped portions 20e and 20f respectively formed on the outer peripheral surface of the flange portion 20b and the lower outer periphery of the internal cylindrical shaft portion 20a.

Figure 6:
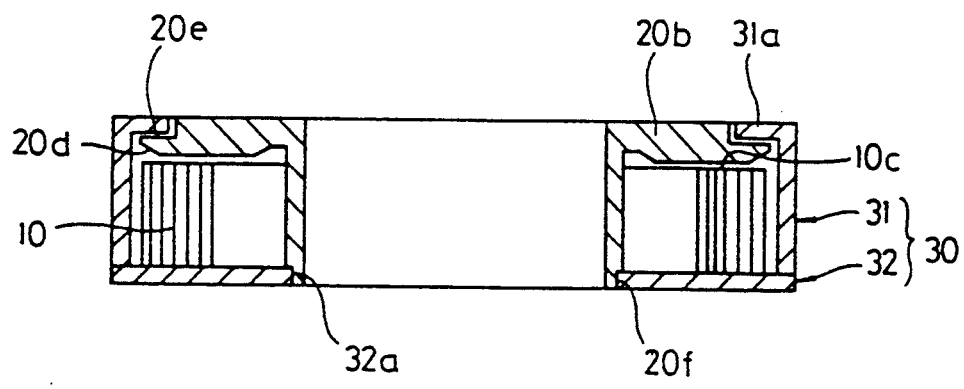
FIG. 6 is a vertical cross sectional view of the above device.

As shown in FIG. 3 and 6, the fixed housing 30 is formed of an external cylindrical portion 31 and a base plate 32 and is fixed on a fixed member (not shown) on the body of the car.

As shown in FIG. 3, the external cylindrical portion 31 is a cylindrical member having an outer diameter slightly larger than that of the flange portion 20b of the movable housing 20, and as shown in FIG. 6, a flange portion 31a inwardly extending in a radial direction is formed integrally with the upper end portion of the external cylindrical portion 31. The flange portion 31a is engaged with the stepped portion 20e formed on the flange portion 20b with play therebetween when the housings 20 and 30 are combined together.

A connecting portion 31c projecting from the wall surface towards the exterior in a radial direction is formed on the exterior cylindrical portion 31. The connecting portion 31c is used to lead the other end portion of the flat cable 10 therein via a slit 31b (FIG. 4) and connect the same to a present lead wire (not shown). The mold section 12 of the other end of the flat cable 10 is set in the connecting portion 31c.

The base plate 32 has substantially the same outer diameter as the external cylindrical portion 31 and an opening 32a which is engaged with an stepped portion 20f of the internal cylindrical shaft portion 20a is formed in the center of the base plate 32. Further, a connection cylinder 32b for receiving the lower portion of the mold section 12 and for connection with the external connection terminal is integrally formed with the base plate 32 in a position corresponding to the connecting portion 31c of the external cylindrical portion 31.

The connector device can be set up by putting the above members one upon the other in an axial direction in the order of the base plate 32, flat cable 10, movable hosing 20 and fixed housing 30, fixing one end portion of the flat cable 10 on the internal cylindrical shaft portion 20a together with an end support 40 (FIG. 4), setting the mold section 11 into the connecting portion 20c and setting the mold section 12 into the connecting portion 31c and connecting cylinder 32b.

A described above, the connector device of this embodiment has the projecting portion 20d formed on the underside of the flange portion 20b of the movable housing 20, and a clearance in the axial direction between the flat cable 10 and the flange portion 20b is made smaller in the intermediate portion of the flat cable 10 than in the opposite end portions of the flat cable 10 at which the flat cable 10 is fixed on the housings 20 and 30. Therefore, vibration of the flat cable 10 occurring when the car is running can be suppressed, and generation of an unpleasant bouncing noise can be prevented. Even if the unpleasant bouncing noise is generated, it can be suppressed to be negligible.

Next, there is explained a connector device according to a second embodiment of this invention in which the clearance in the axial direction between the flat cable and the housings 20 and 30 is reduced by modifying the flat cable with reference to FIGS. 9 to 12. In this case, since the connector device has movable and fixed housings 20 and 30 which are formed in substantially the same manner as in the above embodiment except that the projecting portion 20d is not formed on the underside of the flange portion 20d, the detail explanation thereof is omitted.

Figure 9:
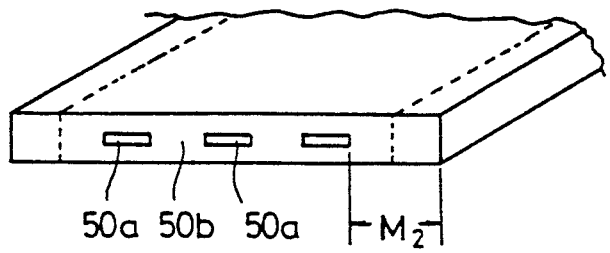
FIG. 9 is a perspective view showing the main portion of a flat cable used in a connector device according to a second embodiment of this invention.
Figure 10:
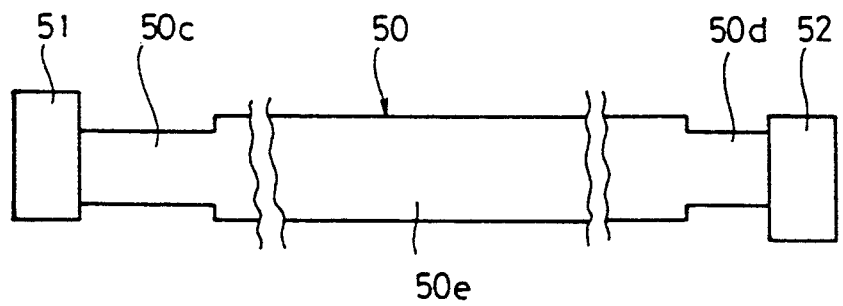
FIG. 10 is a plan view showing the entire developed portion of the flat cable of FIG. 9.

As shown in FIG. 9, the flat cable 50 has a plurality of flat rectangular conductive members 50a arranged in parallel and coated with a polyester film 50b, and as shown in FIG. 10, the width of the opposite end portions 50c and 50d is made smaller than that of the intermediate portion 50e. That is, as shown in FIG. 9, the flat cable 50 is so formed that the margin $M_2$ of both end portions in the width direction thereof may be made larger than the margin $M_1$ (FIG. 5) of the flat cable 10, and opposite end portions 50c and 50d (FIG. 10) on which mold sections 51 and 52 are formed may be partly cut out in the width direction so as to be formed in a stepped configuration, thus making the intermediate portion 50e wider.

Figure 11:
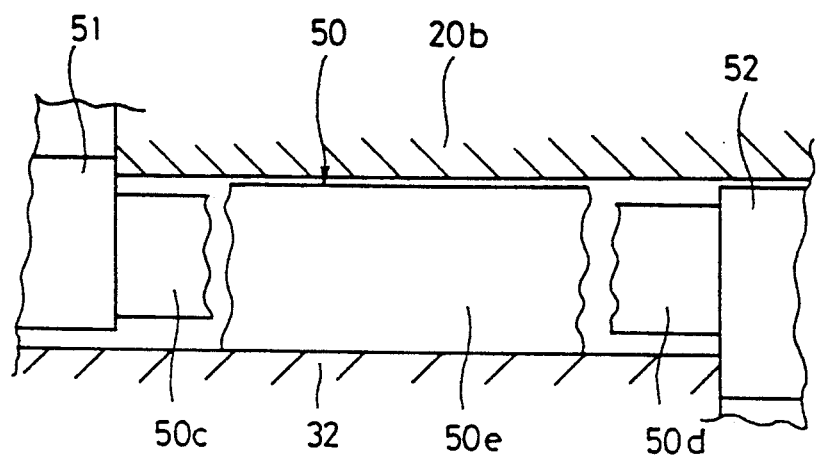
FIG. 11 is a front view of the main portion showing the relation between the connector device and the flat cable.

Therefore, as shown in FIG. 11, a clearance in the axial direction between the flat cable 50 and the underside of the flange portion 20b of the movable housing 20 is made smaller in the intermediate portion 50e of the flat cable 50 than in the opposite end portions 50c and 50d, such that the flat cable just fits between said housings. As a result, vibration of the flat cable 50 caused when the car is running can be suppressed, thereby making it possible to reduce the unpleasant bouncing noise.

Figure 12:
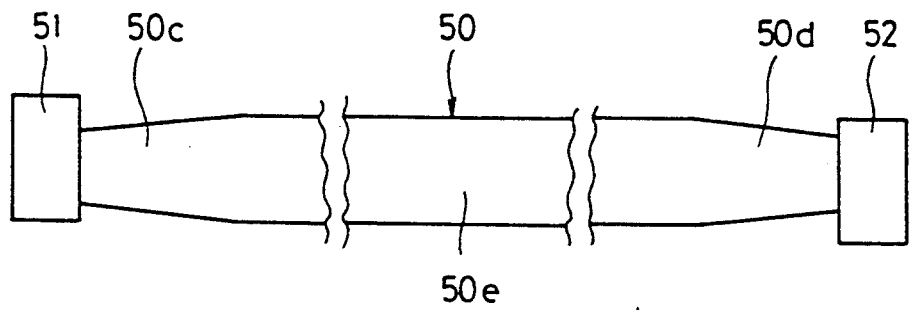
FIG. 12 is a plan view showing another shape of the flat cable of FIG. 9.

Further, the flat cable 50 has the opposite end portions 50c and 50d which are cut out in the stepped form and are fixed on the housings 20 and 30. However, it is also possible to taper the opposite end portions 50c and 50d with respect to the intermediate portion 50e so that the width of the flat cable 50 may be made gradually smaller towards the opposite end portions as shown in FIG. 12.

With this connector device, if the flat cable can be smoothly loosened and tightened, it is possible to combine the first and second embodiments, form a projecting portion on at least one of the internal surfaces of the housings 20 and 30 and set the width of the intermediate portion of the flat cable larger then that of the opposite end portions respectively fixed on the housings 20 and 30. In this case, generation of the unpleasant bouncing noise can be prevented.

Figure 13:
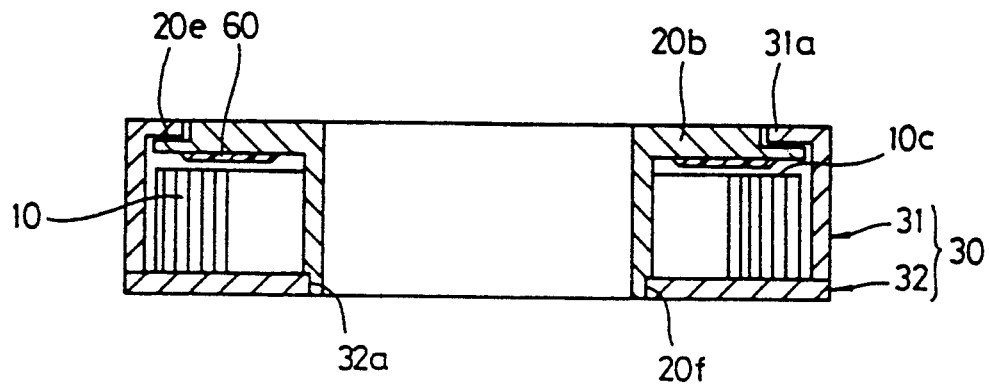
FIG. 13 is a vertical cross sectional view of a connector device according to a third embodiment of this invention.
Figure 14:
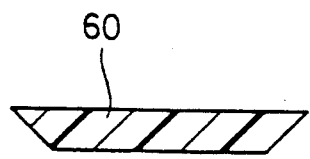
FIG. 14 is a cross sectional view of a spacer mounted on the above device.
Figure 15:
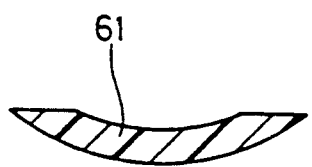
FIG. 15 is a cross sectional view showing a modification of the spacer.

Now, there is explained a third embodiment in which a spacer is mounted on the housing 20 to make the clearance between the flat cable and the housings 20 and 30 smaller with reference to FIGS. 13 to 15. In the connector device of this embodiment, the movable and fixed housings 20 and 30 are formed in substantially the same manner as in the first embodiment except that the projecting portion 20d is not formed on the underside of the flange portion 20b. Therefore, portions which are the same as those of the first embodiment are denoted by the same reference numerals and the detail explanation therefor is omitted.

The connector device of this embodiment has a ring-form spacer 60 disposed on the internal surface of the movable housing 20, that is, on the underside of the flange portion 20b which faces the winding side surface 10c of the flat cable 10. As shown in FIG. 14, the cross section of the spacer 60 taken along the radial direction takes an inverted flat trapezoid form and it is formed of soft material such as nylon.

In a case where the spacer 60 is mounted on the underside of the flange portion 20b of the movable housing 20, a clearance in the axial direction between the underside of the flange portion 20b of the movable housing 20 and the flat cable 12 is made smaller in the intermediate portion of the flat cable 10 than in the end portions of the flat cable 10. And also, vibration of the flat cable 10 caused by the running of the car can be damped or suppressed by the spacer 60 of soft material. Decrease in the clearance in the intermediate portion of the flat cable 10 and the damping of vibration of the flat cable 10 by the spacer 60 may suppress occurrence of the unpleasant bouncing noise. Further, the unpleasant noise can be cut off by the spacer 60 and will not leak to the exterior of the connector device, thus further reducing the unpleasant bouncing noise.

A spacer 61 shown in FIG. 15 can be used as the spacer. The spacer 61 is formed in a ring configuration and the cross section thereof in the radial direction takes an arc form in which the intermediate portion in the width direction thereof protrudes towards the winding side surface 10c of the flat cable 10. Further, the spacer may be formed of a plurality of small divided sections which are arranged at a regular interval along the periphery thereof.

In the above embodiments, the clearance in the axial direction between the intermediate portion of the flat cable and the housings 20 and 30 is made small by forming the projecting portion 20d on the flange portion 20b of the movable housing 20 or mounting the spacer 60 on the flange portion 20b. However, it is also possible to make the clearance smaller by, for example, forming a projecting portion towards the flat cable 10 on the fixed housing, that is, base plate 32 or mounting the spacer 60 on the upper surface of the base plate 32 in the first embodiment.

What is claimed is:

1. In a connector device which comprises a flexible flat transmission line wound in a spiral form, a movable housing having an internal cylindrical shaft portion which acts as a rotation shaft and on which one end of said flat transmission line is fixed, and a fixed housing having an external cylindrical portion on which the other end of said transmission line is fixed, said movable and fixed housing being freely rotatably combined with each other to define an internal space therebetween for receiving said flat transmission line, and said movable and fixed housing being rotated relative to each other by a plurality of revolutions according to a tightening or loosening of said flat transmission line in said internal space, the improvement wherein:

each of said movable and fixed housings has an internal surface facing said internal space and facing a corresponding one of side edge surfaces of said flat transmission line wound in said spiral form; and a projecting portion is formed on at least one of said internal surfaces of said housings, said projecting portion projecting toward one of said side edge surfaces of said flat transmission line; and a clearance is provided in an axial direction along said rotation shaft between said one side edge surface of said flat transmission line and said movable housing, or between another side edge surface of said flat transmission line and said fixed housing, said clearance being set to be smaller at an intermediate portion of said spirally wound flat transmission line than at at least one of the end portions of said spirally wound flat transmission line.

2. A connector device according to claim 1, wherein said flat transmission line is formed wider at the intermediate portion thereof than said at at least one of the end portions thereof.

3. A connector device according to claim 1, wherein said projecting portion comprises a spacer mounted on at least one of said internal surfaces of said housings, said spacer projecting from said at least one internal surface toward a respective said side edge portion of said flat transmission line.

4. A connector device according to claim 3, wherein said spacer is arranged to face the intermediate portion of said spirally wound flat transmission line, and is not formed at positions facing said at least one of the end portions of said spirally wound flat transmission line, thereby providing a reduced clearance at said intermediate portion of said spirally wound transmission line.

5. A connector device according to claim 1, wherein said projecting portion projects from a respective one of said internal surfaces of said housings only in the vicinity of the intermediate portion of said spirally wound flat transmission line.

6. A connector device according to claim 1, wherein said projecting portion is provided on only one of said movable and fixed housings.

7. A connector device according to claim 1, wherein said flat transmission line is an electrically conductive line for transmitting an electric signal or electric power.

8. A connector device according to claim 1, wherein said flat transmission line is a light transmission line for transmitting a light signal.

9. A connector device according to claim 1, wherein said flat transmission line is a combination of an electrically conductive line for transmitting an electric signal or electric power and a light transmission line for transmitting a light signal.

10. In a connector device which comprises a flexible flat transmission line would in a spiral form, a movable housing having an internal cylindrical shaft portion which acts as a rotation shaft and on which one end of said flat transmission line is fixed, and a fixed housing having an external cylindrical portion on which the other end of said transmission line is fixed, said movable and fixed housing being freely rotatably combined with each other to define an internal space therebetween for receiving said flat transmission line, and said movable and fixed housings being rotated relative to each other by a plurality of revolutions according to a tightening or loosening of said flat transmission line in said internal space, the improvement wherein:

each of said movable and fixed housings has an internal surface facing said internal space and facing a corresponding one of side edge surfaces of said flat transmission line wound in said spiral form; and a projecting portion is formed on at least one of said internal surfaces of said housings, said projecting portion projecting toward one of said side edge surfaces of said flat transmission line; and a clearance is provided in an axial direction along said rotation shaft between said one side edge surface of said flat transmission line and said movable housing, or between another side edge surface of said flat transmission line and said fixed housing, said clearance being set to be smaller at an intermediate portion of said spirally wound flat transmission line than at least one of the end portions of said spirally wound flat transmission line;

wherein said projecting portion projects from a respective one of said internal surfaces of said housings only in the vicinity of the intermediate portion of said spirally wound flat transmission line; and wherein said projecting portion has a substantially flat surface facing said side edge surface of said intermediate portion of said spirally wound flat transmission line, and wherein said projection portion has inclined side surfaces at side edge portions thereof which are inclined away from said side edge surface of said flat transmission line.

* * * * *